Figure 1:
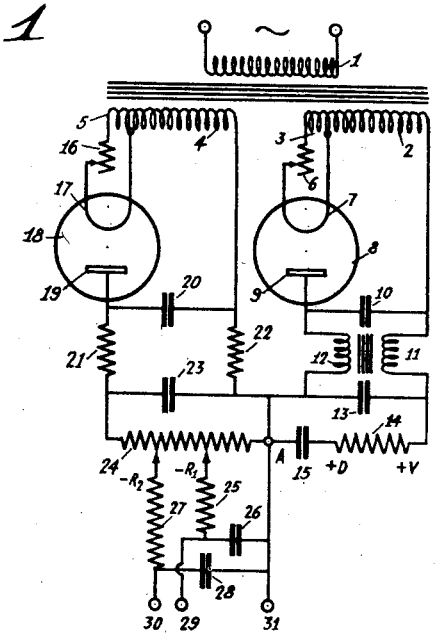

Aug. 30, 1932.   E. OOSTERHUIS ET AL   1,875,123
GRID BIASING UNIT FED BY ALTERNATING CURRENT

Filed Nov. 26, 1927

INVENTOR
EKKO OOSTERHUIS
BY JACOB M. UNK
ATTORNEY

Patented Aug. 30, 1932

1,875,123

UNITED STATES PATENT OFFICE

EKKO OOSTERHUIS AND JACOB MARINUS UNK, OF EINDHOVEN, NETHERLANDS, ASSIGNORS TO RADIO CORPORATION OF AMERICA, A CORPORATION OF DELAWARE

GRID-BIASING UNIT FED BY ALTERNATING CURRENT

Application filed November 26, 1927, Serial No. 235,925, and in the Netherlands December 14, 1926.

In amplifying electric oscillations with the aid of so-called thermionic valves, it is desirable, as a rule to maintain the control grids of these valves on such an average potential that during the operation, grid currents never start flowing. A constant negative voltage is therefore, usually applied to the said grids, for which purpose one or more galvanic cells are frequently used.

For tapping the required grid biasing potentials it has also been suggested to make use of a potentiometer which is traversed by a rectified and smoothed alternating current which can be derived from the lighting system, if desired, with the use of a transformer. It is evident that in that case, use can be made of the same rectifier and smoothing device which also serve to supply the plate current for the various valves of the station, which plate current may then be led, for example through the potentiometer. In doing so, however, two difficulties are encountered: First, the degree of smoothing which is just sufficient for the plate current is insufficient for the grid biasing potentials, especially if the amplification factors of the valves are large.

Secondly, since the biasing potentials are, of course, negative, the high tension unit has to furnish a direct current voltage which is equal to the sum of the absolute values of the highest plate voltage and the largest biasing voltage that has to be applied. The latter may be 25% and more of the plate voltage so that the efficiency of the device decreases by the same high percentage.

According to the invention, these two difficulties are simultaneously obviated by feeding the potentiometer from which the grid biasing potentials can be tapped, from a separate rectifier with associated smoothing device.

Since in the grid circuit a current is never allowed to flow, the current passing through the potentiometer may be extremely feeble, owing to which 1. A small rectifier can be used.
2. A perfect smoothing effect is not difficult to obtain.
3. The loss of energy becomes negligible.

In connection with the advantage mentioned under 2, it should be noted that with a device according to the invention it is not only possible but even desirable to use ohmic resistances instead of choking coils for the smoothing effect, owing to which the apparatus is made both cheaper and much lighter.

Figure 2:
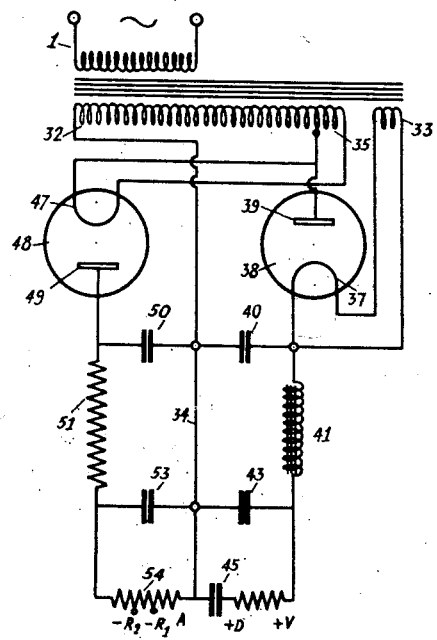

The invention will be more clearly understood by referring to the accompanying drawing representing by way of example two embodiments of the invention in conjunction with a normal, known plate voltage supply. In this drawing:

Figure 1 represents a circuit arrangement with two separated rectifiers and associated smoothing devices, Figure 2 represents a circuit arrangement comprising one common secondary transformer winding.

Figure 1 will be described first.

The primary winding 1 of a transformer may be connected to the alternating current lighting system. This transformer comprises four secondary windings 2, 3, 4 and 5. The winding 2 serves to supply the required plate voltage which can be tapped between the terminals +V or +D and the terminal A. The winding 3 serves to feed the filament 7 of a rectifying valve 8, a regulable resistance 6 being provided for the control of the current. The plate 9 of the rectifier 8 is connected to one of the armatures of a condenser 10 and also to one end of a winding 12 of a choking coil which has its other winding 11 connected to the right-hand end of the transformer winding 2 and also to the other armature of the condenser 10. A second condenser 13 is connected between the two other ends of the choking coil windings 11 and 12, the windings 12 and 11 being further connected to the point A which may be earthed, and to the point +V respectively. Between the points +V and +D is inserted a high ohmic resistance 14, a condenser 15 being finally connected between the points A and +D. The above described arrangement is known per se and as such it does not form part of the invention.

The transformer winding 4 serves to supply current to a potentiometer 24; this current is beforehand rectified with the aid of a rectifier 18 and is then smoothed out with the aid of condensers 20 and 23 and of two resistances 21 and 22. The rectifier 18 comprises a cathode 17 which is fed through a variable resistance 16 by the transformer winding 5 and it further comprises an anode 19. Finally, the potentiometer 24 is provided with a number of sliding contacts or tapping points, (two in the case illustrated), which are marked $-R_1$ and $-R_2$ respectively and to which the grids of the discharge tubes of the wireless station may be connected. Should the ripple of the rectified current not yet be smoothed out to a sufficient extent, the connection of the grids may be established, as shown in the drawing, via resistances 25 and 27 respectively, the ends of which are connected across condensers 26 and 28 respectively to the point A. In that case the connection with the grids is made at the terminals 29 and 30 respectively whilst the filaments of the receiving set are connected to a terminal 31.

Since the grid circuits of the said discharge tubes may not be traversed by current, at any rate not when these tubes are used as amplifiers, the current with which the potentiometer 24 is fed, can be kept as small as desired. In connection therewith, first, a small rectifier 18 will suffice and further the use of high resistances 21 and 22 is to be preferred to the use of choking coils as the latter are heavy and expensive. The potential drop produced in the high ohmic resistances is not dis-advantageous in the case under consideration as owing to the extremely small value of the current the energy lost in this way yet remains only immaterial.

Figure 2 represents a circuit arrangement comprising only one single secondary transformer winding 32, the right-hand end of which is connected to the anode 39 of a rectifier 38 and also to the cathode 47 of the rectifier 48. The cathode 47 is fed by a winding 35 and the cathode 37 is fed by a winding 33 which must be insulated from the two other secondary windings. The diode 38 supplies the plate current and the diode 48 supplies the potentiometer current for the negative grid biases. One of the smoothing devices consists of a choking coil 41 with one winding and of two condensers 40 and 43 which are connected respectively to the two ends of the said winding. The other smoothing device consists of one single resistance 51 and of two condensers 50 and 53 respectively the two circuits in which the rectified currents flow, have a continuous conductor 34 in common, said conductor leading the left-hand end of the winding 32. The terminals marked $+V$, $+D$, A, $-R_1$ and $-R_2$ are similar to those shown in Figure 1.

It is not absolutely necessary to use the device for supplying the grid voltages in conjunction with a device for supplying the rectified and smoothed plate current, as above described, but the first-mentioned device may also be used separately, in combination with direct current batteries for the supply of plate and filament current or not, and in general, it may be used wherever it is desired to derive constant direct voltages from an alternating current supply and wherever the direct currents to be tapped from the points with constant voltage, are substantially equal to zero.

Having described our invention what we claim is:

1. A circuit arrangement for supplying plate and grid potentials from an alternating current supply comprising a transformer having a primary winding connected to the alternating current supply, a grid potential source including a rectifying device fed by a secondary winding on said transformer, a smoothing out circuit composed of condensers and resistances connected to the output elements of said rectifying device, a resistance connected across the terminals of said smoothing out device, a plurality of connectors tapped to variable points on said resistances, a resistance in each of said connectors, a plate potential source including a rectifying device fed by said transformer, a smoothing out circuit composed of condensers and inductances connected to the output elements of said last named rectifying device, a resistance and condenser connected in series across the terminals of said last named smoothing out circuit, and a connection between said smoothing out circuits.

2. A circuit arrangement for supplying plate and grid potentials from an alternating current supply comprising a transformer connected to the alternating current supply, a grid potential source including a rectifying device fed by said transformer, a smoothing out circuit including a network composed of a resistance and condensers connected to the output element of said rectifier, a resistance connected across the terminals of said smoothing out circuit, a plurality of connectors tapped to variable points on said resistance, a resistance in each of said connectors, and a condenser connected between the terminals of said connectors and one end of said terminal resistance, a rectifying and smoothing out circuit for the plate potential connected to said transformer, a resistance connected across the terminals of said last named smoothing out circuit and a connection between said terminal resistances.

3. A circuit arrangement for supplying plate and grid potentials from an alternating current source including a transformer the primary winding of which is connected to said source, a plurality of secondary windings on said transformer, a pair of thermionic rectifier tubes each having an anode and a cathode said cathode being heated by one of said secondary windings, a connection between one end of one of said secondary windings and the cathode of one of said rectifying tubes, a smoothing out device including a network composed of a series resistance and parallel condensers connected between the anode of said last named tube and the free end of said secondary winding, means for connecting the anode of the other of said rectifying tubes to the cathode of the first named rectifying tube, and a smoothing out circuit including a network of inductances and condensers connected between the cathode of said last named rectifying tube and the free end of said secondary winding, a plurality of terminal contacts associated with each of said smoothing out devices.

4. A circuit arrangement for supplying plate and grid potentials from an alternating current source including a transformer the primary winding of which is connected to said source, a plurality of secondary windings on said transformer, a pair of rectifying devices each having an anode and a cathode said cathode being heated by one of said secondary windings, a connection between one end of one of said secondary windings and the cathode of one of said rectifying devices, an output circuit connected between the anode of said device and the free end of said secondary winding, a smoothing out device comprising a network composed of a series resistance and parallel condensers in said output circuit, means for connecting the anode of the other of said thermionic devices to the cathode of said first named device, an output circuit connected between the anode of said last named device and the free end of said secondary winding, a smoothing out device comprising a network of inductances and condensers in said output circuit, and a tapped resistance connected across the terminals of each of said smoothing out devices.

5. A device for supplying plate and grid potentials from an alternating current supply, including a pair of rectifying devices having anode and cathode electrodes, a smoothing out device for each rectifying device, means for supplying alternating current to said devices comprising a transformer having a primary winding connected to said alternating current supply and a secondary winding which has one end connected to the anode of the first rectifier and to the cathode of the second rectifier, the other end of said secondary winding being connected through one of said smoothing out devices to the cathode of said first rectifier and through the other smoothing out device to the anode of said second rectifier.

6. In power circuits, the combination of a source of pulsating direct current, a current smoothing circuit connected with said source, an impedance connected across the terminals of said current smoothing circuit, a plurality of contacts connected to taps on said impedance including resistance elements, a capacity connecting each of said last named resistances to one terminal of said current smoothing circuit, and a second source of pulsating direct current having its low side connected to the high side of said first named source.

EKKO OOSTERHUIS.
JACOB MARINUS UNK.